United States Patent [19]

Snyder

[11] Patent Number: 4,644,789

[45] Date of Patent: Feb. 24, 1987

[54] LIQUID LEVEL INDICATOR SYSTEM

[75] Inventor: Daniel S. Snyder, Norwalk, Ohio

[73] Assignee: Clevite Industries Inc., Glenview, Ill.

[21] Appl. No.: 811,423

[22] Filed: Dec. 20, 1985

[51] Int. Cl.$^4$ ............................... G01F 23/00; H01L 41/08
[52] U.S. Cl. ............................... 73/290 V; 73/290 R; 310/319; 310/321
[58] Field of Search ............... 73/290 V, 651, DIG. 1, 73/DIG. 4, 290 R; 340/621, 683; 310/319, 321, 316, 336, 338

[56] References Cited

U.S. PATENT DOCUMENTS

| | | | |
|---|---|---|---|
| 3,206,979 | 9/1965 | Banks | 73/290 V |
| 3,834,233 | 9/1974 | Willis et al. | 73/290 V |
| 4,144,517 | 3/1979 | Baumoel | 73/290 V |
| 4,307,602 | 9/1981 | Sawada et al. | 73/35 |

FOREIGN PATENT DOCUMENTS

| | | | |
|---|---|---|---|
| 1062663 | 4/1954 | France | 73/290 V |
| 189018 | 11/1982 | Japan | 73/290 V |
| 2054853 | 2/1981 | United Kingdom | 73/290 V |
| 2119090 | 11/1983 | United Kingdom | 73/290 V |

OTHER PUBLICATIONS

Kevin Smith, "Vibrating Transducer Has Digital Output", *Electronics*, vol. 53, No. 16, Jul. 1980.

*Primary Examiner*—Charles Frankfort
*Assistant Examiner*—W. Morris Worth
*Attorney, Agent, or Firm*—Russell E. Baumann

[57] ABSTRACT

A liquid level indicator system is provided for sensing the presence of liquid at a preselected level in a liquid containing container. A piezoelectric reed transducer is disposed in the container for detecting vibrational movement and for producing an electrical signal in response to the vibrational movement. Operationally coupled to the transducer is a paddle which is sized to be immersed in the liquid when the liquid is present at the proper level. Immersion of the paddle in the liquid inhibits the transducer from vibrating due to fluid resistance against the paddle and accordingly inhibits an electrical signal output from the transducer. A control circuit is provided for sensing the electrical signal generation and for generating an alarm signal representative of low liquid level. A tubular housing is provided for containing a level of liquid representative of liquid level in the liquid container. The reed is preferably tuned to a preselected natural frequency sympathetic to ambient system vibrations. Where the indicator system is desired to be used in an environment containing no ambient vibrations, an oscillator driver is provided for communicating a driving frequency to the reed for vibrating the reed at its natural frequency.

8 Claims, 4 Drawing Figures

U.S. Patent  Feb. 24, 1987  4,644,789
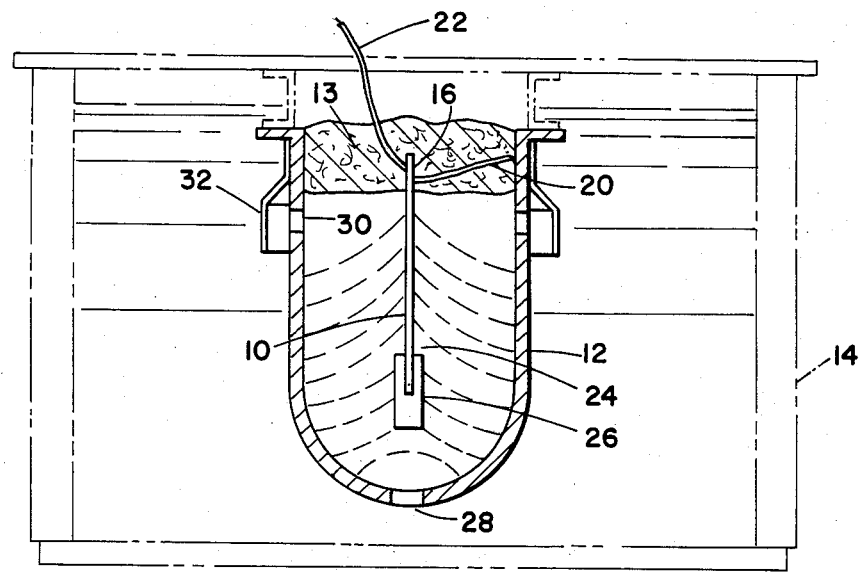
FIG. 1
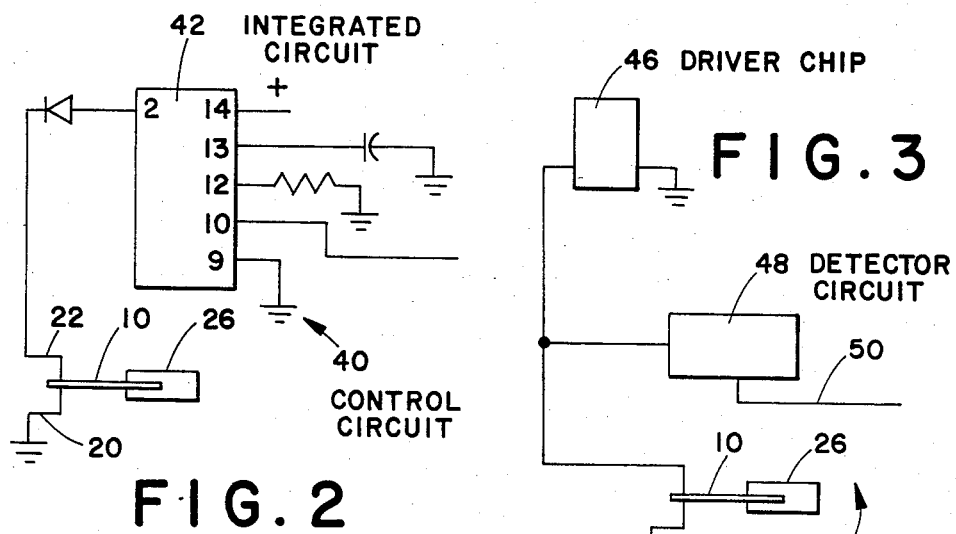
FIG. 2
FIG. 3
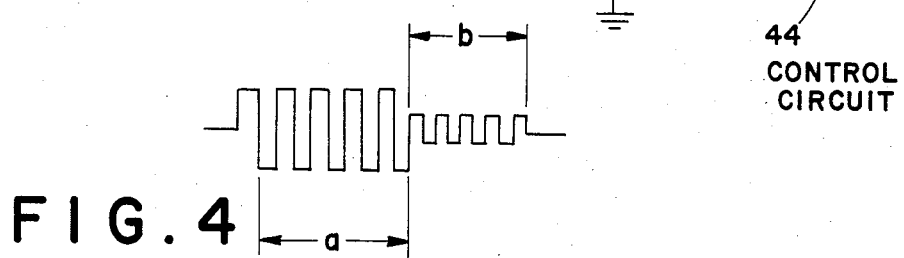
FIG. 4

LIQUID LEVEL INDICATOR SYSTEM

BACKGROUND OF THE INVENTION

This invention pertains to the art of fluid sensing devices and, more particularly, to a device for sensing the presence or absence of a liquid at a preselected level.

The invention is particularly applicable to a liquid level indicator system useful for motor vehicle applications such as monitoring engine oil level, engine coolant level, or other motor vehicle liquid levels. However, it will be appreciated to those skilled in the art that the invention could be readily adapted for use in other environments where there is a need for a stable liquid level sensing system subject to dynamic operating conditions in a harsh environment.

There has always been a need for improved liquid monitoring devices for particular applications with motor vehicle systems. The various forms and types of liquid level indicator systems that have heretofore been employed in the industry, have met with varying degrees of success. These prior indicator systems have ranged from electromechanical devices to complex systems of fiber optics. It has been found that the defects present in most such prior systems are such that the systems themselves are of limited economic and practical value.

Prior known electromechanical systems have been particularly sensitive to vehicle motion and vehicle level. The transient conditions resulting from vehicle motion have either generated false alarms or required complex indicator insulating structures. The fiber optic systems, apart from their excessive complexities, have also proved overly sensitive to liquid contamination, color changes, moisture, and the like which have limited their practical value.

The present invention contemplates a new and improved device which overcomes the above referred to problems and others to provide a new liquid level indicator assembly which is simple in design, economical to manufacture, readily adaptable to a plurality of uses with fluid systems having a variety of dimensional characteristics, applications, and environments and which provides improved liquid level indication.

BRIEF SUMMARY OF THE INVENTION

In accordance with the present invention, there is provided a liquid level indicator assembly for a container containing a liquid comprising a piezoelectric transducer means for detecting vibrational movement and for producing an electrical signal in response to the vibrational movement. Paddle means that are operationally coupled to the transducer means are immersed in the fluid to inhibit the vibrational movement of the transducer means due to fluid resistance against such movement by the paddle means and thereby inhibit electrical signal generation. Control circuit means are coupled to the transducer means for sensing the electrical signal generation and generating an alarm signal representative of low liquid level where a reduction of fluid below a preselected level allows a vibrational movement of the paddle means and consequential electrical signal generation by the transducer means representative of a low liquid level.

In accordance with another aspect of the present invention, the piezoelectric transducer means comprises a piezoelectric beam or reed, mass tuned to a preselected natural frequency of vibration which is sympathetically responsive to ambient operating vibrations to the liquid level indicator assembly.

In accordance with a further aspect of the present invention, where the indicator assembly is applied in a system lacking ambient operating vibrations, an oscillator driver is coupled to the transducer means to provide a voltage to the transducer means at its resonant frequency. When the paddle means is immersed in a fluid, the drive current will increase as the transducer means will be unable to vibrate at its resonant frequency, but if the fluid is low, and the transducer means is capable of vibrating, the oscillator driver will be capable of vibrating the transducer means, and such vibration is detected as being representative of low liquid level.

In accordance with yet another aspect of the present invention, a housing is provided for the transducer means sized to contain a representative sample of the liquid and which housing includes access means for communicating the liquid from the container to the housing. The piezoelectric beam is fixed in the housing at one beam end and immersed in a liquid at another beam end. The other beam end being contiguous to the access means. The paddle means is fixed to the other beam end and immersed in the liquid.

In accordance with yet another aspect of the present invention, the control circuit means includes circuit delay means for delaying a low liquid level alarm signal generation for a preselected count to compensate for transient low liquid levels.

One benefit obtained by use of the present invention is a reliable, simple, and accurate liquid level indicatory system.

Another benefit obtained from the present invention is a liquid level indicator system which is particularly applicable to sensing of liquid containers on a moving vehicle which may withstand the harsh operating conditions therein and recognize the transient liquid level conditions during operation without indicating an alarm representative of low liquid levels.

Other benefits and advantages for the subject new liquid level indicator system will become apparent to those skilled in the art upon a reading and understanding of this specification.

BRIEF DESCRIPTION OF THE DRAWINGS

The inventon may take physical form in certain parts and arrangements of parts, the preferred embodiments of which will be described in detail in this specification and illustrated in the accompanying drawings which form a part hereof and wherein:

FIG. 1 is a cross-sectional view of a portion of a low liquid level indicator system formed in accordance with the present invention showing a system housing containing a piezoelectric transducer immersed in a liquid present in the housing;

FIG. 2 is a schematic of a control circuit formed in accordance with the present invention;

FIG. 3 is a schematic of a control circuit formed in accordance with an alternative embodiment of the invention; and, FIG. 4 is an illustration of a control circuit output signal produced by the control circuit of FIG. 3 under various operating conditions.

DETAILED DESCRIPTION OF THE INVENTION

Referring now to the drawings wherein the showings are for purposes of illustrating the preferred and one alternative embodiment of the invention only and not for purposes of limiting same, the FIGURES show a liquid level indicatory system for detecting the presence and absence of liquid in a container at a preselected level.

More particularly, and with reference to FIG. 1, the system is comprised of a piezoelectric reed element 10 deployed as a tuned resonant beam for detecting vibrational movement and for producing an electrical signal in response to said vibrational movement. The reed 10 thus comprises a transducer for translating vibrational movement into an electrical control signal. The reed 10 is mounted in a housing 12 sized to contain a level of liquid representative of liquid level in an other container 14. More specifically, container 14 may comprise a crank case, radiator, transmission fluid container, or the like as the invention may be applied to motor vehicles; however, it is within the scope of the invention that container 14 may comprise any kind of fluid container.

The reed 10 is fixed in the housing at one end 16 which is set in a housing cap 18 which comprises a setting material like an epoxy (Tra-Con 3103). Reed lead wires 20, 22 comprise a ground connection and a control circuit connection, respectively, for the communication of output control signals from the reed 10. Ambient vibrations of a vehicle to which container 14 is attached are transmitted to the reed 10 by attachment of the housing 12 in a conventional fastening manner which effectively communicates the vibrations through the housing walls and through the housing cap 18 to the reed.

The reed 10 is mass tuned to a resonant frequency sympathetic to the ambient operating vibrations of the vehicle by selective sizing of a paddle 26 secured to an other end 24 of the reed.

The paddle 26 is positioned for immersion in the sample of the liquid contained in the housing 12. When so immersed, the paddle provides a substantial engagement surface against the liquid in the housing 12 which substantially inhibits vibrational movement of the reed 10. The output control signal generated by the reed 10 at line 22 is thus representative of whether the reed 10 may vibrate. In the presence of fluid contained in the housing 12 above a preselected level, the reed will not vibrate. Where the liquid is below a preselected level, or where the liquid has been diluted or otherwise changed to a different unwanted viscosity, reed vibration is not inhibited by paddle engagement of the liquid or less inhibited by paddle engagement of the liquid, and the output control signal is representative of these conditions. That is, this indicator can be used for sensing abnormal liquid conditions (both low level liquid detection and viscosity level detection).

The housing 12 may comprise many particular configurations. Preferably, the configuration selection is one which provides convenient ingress and egress of a representative sample to the housing 12. In the embodiment illustrated in FIG. 1, access opening 28 in the lower end portion of the housing 12, provides a convenient means for communicating the liquid from the container 14 to the housing 12. The tubular configuration of the housing 12 is useful in inhibiting rapid fluctuation in the liquid level in the housing 12. For example, if the housing 12 were mounted in a moving motor vehicle, vent holes 30 and vent or splash skirts 32 allow for rapid pressure equalization between the housing 12 and the container 14. The sizes of the vent holes 30, as well as the liquid access opening 28 is selectively adjustable to accommodate for liquid type, viscosity and for mechanically damping rapid liquid level changes in the housing 12 when the vehicle is accelerating, cornering, etc. The paddle 26 should be sufficiently spaced from the walls of the housing 12 so that the sensed liquid is not held from flowing out of the access opening 28 by surface tension.

With reference to FIG. 2, a control circuit 40 is shown useful for detecting output control signals from the piezoelectric reed 10 that would be generated if the invention were mounted on a device which produces ambient operating vibrations, such as a motor vehicle engine as shown. Circuit 40 includes an integrated circuit 42 similar to that circuit shown in U.S. Pat. No. 4,210,898, commonly assigned with the present application. Pin 14 of circuit 42 comprises input power to the circuit. Pins 12, 13 are connected with capacitive and resistive elements for tuning and timing adjustments of the circuit. Pin 10 communicates with an alarm circuit (not shown) that signifies a low or abnormal liquid condition. More specifically, when the piezoelectric reed sensor 10 can freely vibrate, the electrical signal generation on lead 22 is different from that of the electrical signal generation made when the reed 10 cannot vibrate. Circuit 42 recognizes these differences in signals and indicates at pin 10 when the reed 10 is vibrating due to the low or abnormal liquid conditions. The detection circuit 42 may also act as a counter to count the pulses of a signal train generated by the piezoelectric reed sensor 10 and only generates by an alarm signal at pin 10 when a preselected number of pulses have been counted. The counting delay feature of the detector circuit 42 compensates for transient conditions in the housing 12 that may be generated by motor vehicle acceleration, turning, or the like.

With reference to FIG. 3, an alternative control circuit 44 is shown which may be advantageously employed as a low liquid level indicator in an environment where normal ambient vibration is not available. An oscillator driver chip 46 outputs a drive signal tuned to the natural frequency of the reed 10. A typical such driver chip is manufactured by National Semiconductor Company under Catalog No. LM324. A detector circuit 48, such as a National Semiconductor LM4250, detects the drive current and transmits an alarm signal at lead 50 when the current level is detected as representative of a low or abnormal liquid condition. It is within the scope of the invention to employ a counting time delay in the detector 48 to allow for liquid level transients.

With particular attention to FIG. 4, the drive current of the driver circuit of FIG. 3, is illustrated over a period (a) in which a proper liquid level and condition is maintained in the container. Since the reed is obstructed from vibration by the liquid, it cannot vibrate at its natural frequency and the drive current is higher than if the reed 10 could vibrate. The period (b) of the signal of FIG. 4 is representative of drive current signals where no liquid or an abnormal liquid condition such as a drop in viscosity is present at the reed 10. Since there is no obstruction to vibration of the reed, it can vibrate at its natural frequency and the drive current is accordingly lower. It has been experimentally observed that the drive current is approximately three times greater when the reed 10 is obstructed than when it is free to vibrate.

The invention has been described with reference to the preferred and an alternative embodiment. Obviously, modifications and alterations will occur to others upon the reading and understanding of this specification. It is my intention to include all such modifications and alterations insofar as they come within the scope of the appended claims or the equivalents thereof.

Having thus described my invention, I now claim:

1. A liquid level indicator assembly for a container containing a liquid comprising:

housing means within said container for housing a representative sample of the liquid and including a restrictive access port at one end for communicating the liquid between the housing and container and a vent hole at an other end;

piezoelectric transducer means substantially immersed in said liquid and mounted in said housing means for detecting vibrational movement and for producing an electrical signal in response to vibrational movement of said transducer means, said piezoelectric transducer means comprising a piezoelectric beam which is mass tuned to a preselected natural frequency of vibration by selective sizing of a paddle means affixed to said piezoelectric transducer means;

said paddle means being connected directly to said piezoelectric transducer means immersed in the liquid and operatively engaged to said transducer means to inhibit vibrational movement of said transducer means due to fluid resistance against the paddle means; and control circuit means for sensing said electrical signal and generating an alarm signal representative of an abnormal liquid condition wherein reduction of liquid below a preselected level allows vibrational movement of said transducer means and consequent electrical signal generation by said transducer means, said signal generation being representative of an abnormal liquid level.

2. The indicator assembly as claimed in claim 1 wherein said natural frequency is sympathetically responsive to ambient vibrations transmitted to the liquid level indicator assembly.

3. The indicator assembly as claimed in claim 1 wherein an oscillator driver is directly coupled to said piezoelectric transducer means to provide a drive current to said transducer means.

4. The indicator assembly as claimed in claim 1 wherein said control circuit means includes circuit delay means for delaying alarm signal generation for a preselected count to compensate for transient low liquid levels.

5. The indicator assembly as described in claim 1 wherein said housing means comprises a tubular housing sized for reception in the container including a restrictive fluid access aperture at one end and a vent hole at an other end to control transient fluid flow.

6. The indicator assembly as described in claim 5 wherein said transducer means comprises a piezoelectric beam fixed in said housing at a first housing portion at one beam end and immersed in the liquid at an other beam end, said other beam end being contiguous to a second housing portion opposite said first housing portion.

7. The indicator assembly as described in claim 6 wherein said paddle means is fixed to said other beam end.

8. The indicator assembly as described in claim 6 wherein said one beam end is fixed in said housing in a housing cap in said first housing portion.

* * * * *